May 6, 1941. H. C. DANIELS 2,241,245
COMPOSITE FLUID-CONDUCTING TUBE
Filed March 3, 1939 2 Sheets-Sheet 1
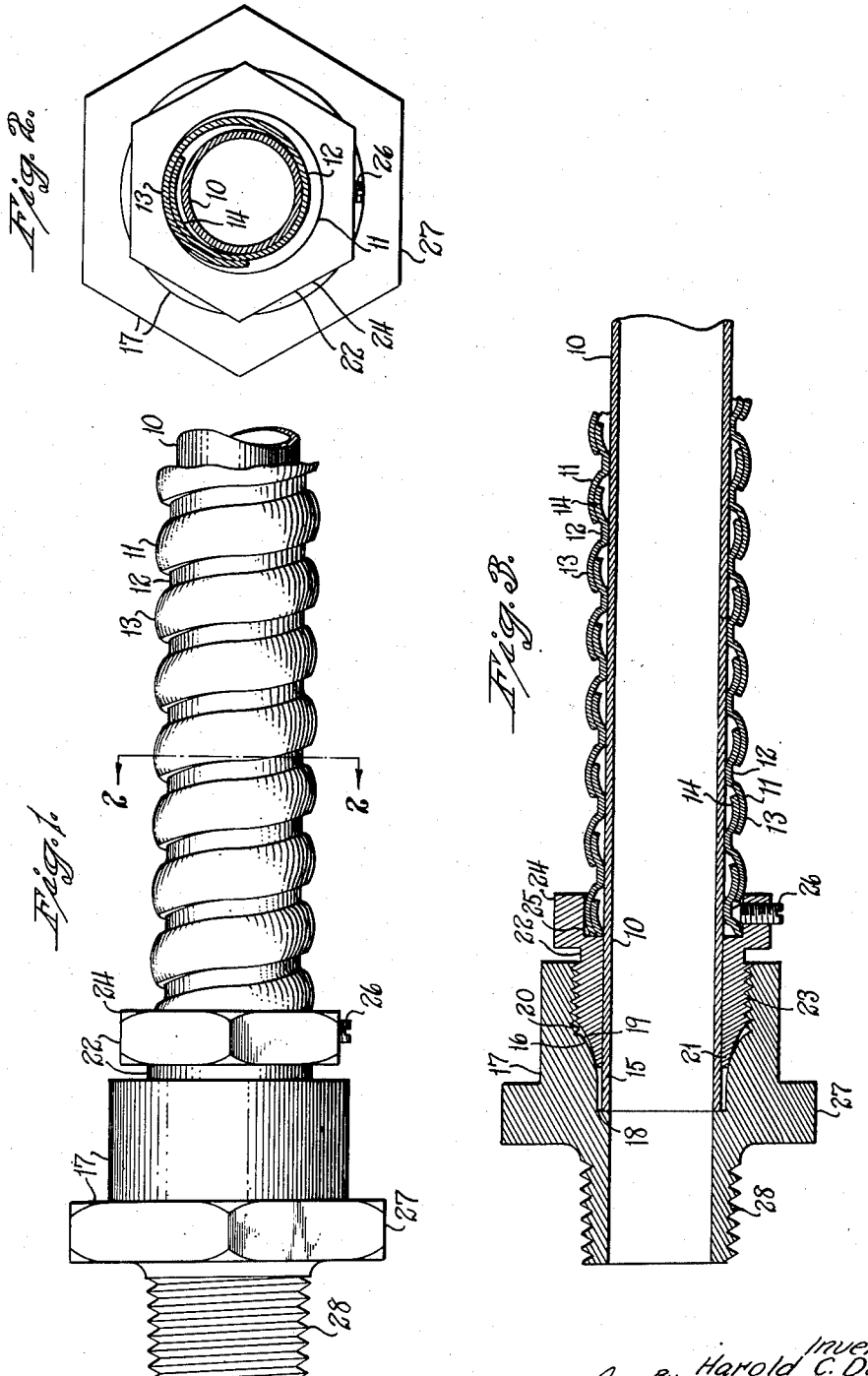
Inventor
Harold C. Daniels
By Seymour Earle & Nichols
Attorneys May 6, 1941.  H. C. DANIELS  2,241,245
COMPOSITE FLUID-CONDUCTING TUBE
Filed March 3, 1939    2 Sheets-Sheet 2
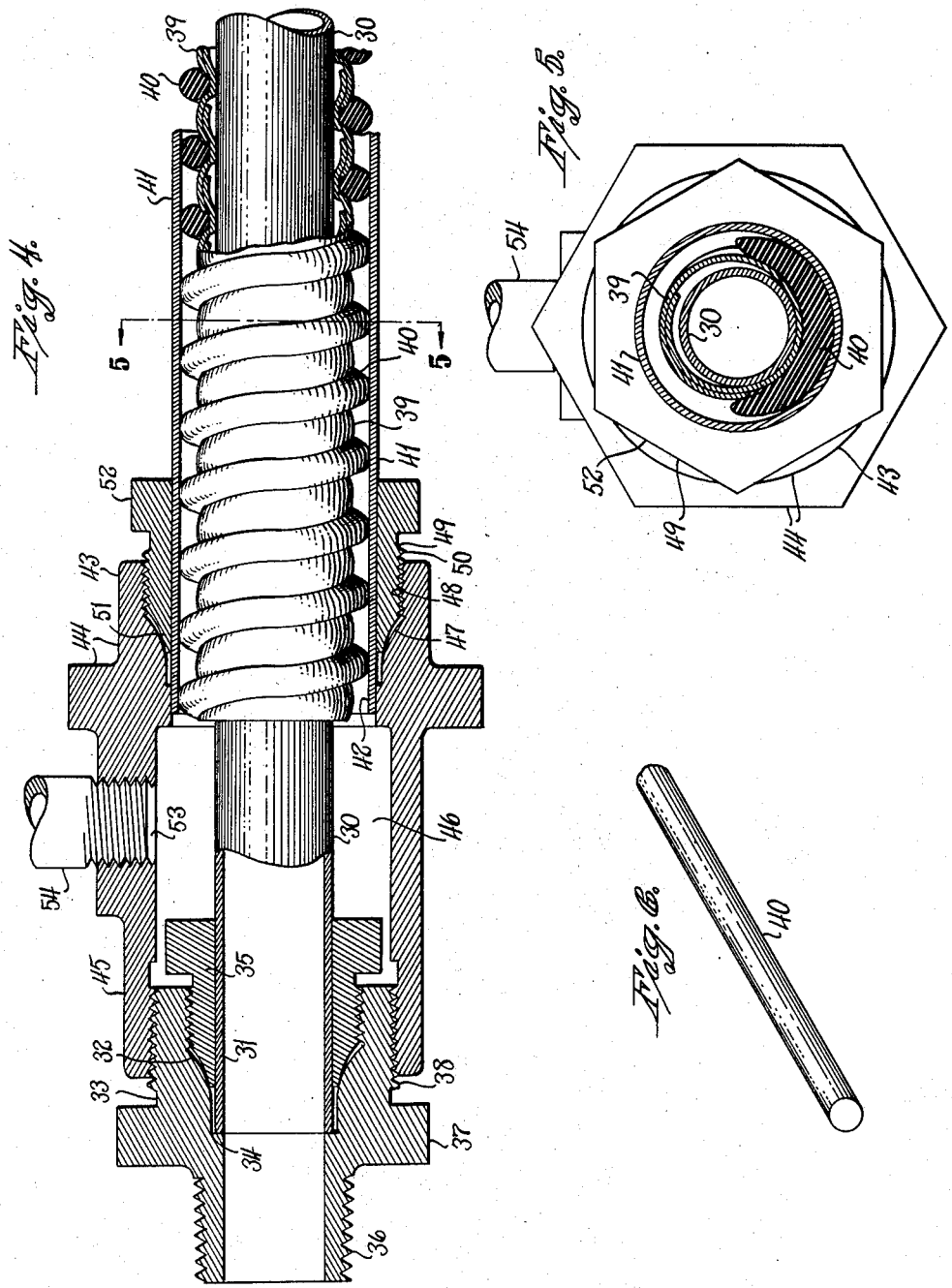
Inventor
Harold C. Daniels
Seymour Earle Nichols
Attorneys Patented May 6, 1941

2,241,245

UNITED STATES PATENT OFFICE 2,241,245

COMPOSITE FLUID-CONDUCTING TUBE

Harold C. Daniels, Woodbury, Conn., assignor to Chase Brass & Copper Co., Incorporated, Waterbury, Conn., a corporation Application March 3, 1939, Serial No. 259,570

3 Claims. (Cl. 138—57)

This invention relates to improvements in fluid-conducting tubes and more particularly to composite or multi-layer fluid-conducting tubes designed for the conveyance of liquids, gases, etc., where superior resistance to rupture is required.

One of the main objects of the present invention is to provide a superior composite fluid-conducting tube having superior resistance to the crystallizing effects of mechanical vibration and hence longer life in use under severe conditions.

Another object of the present invention is to provide a superior composite fluid-conducting tube having superior resistance to bursting or leakage when subjected to the softening or weakening effects of high temperatures, as for instance during a conflagration.

A further object of the present invention is to provide a superior composite fluid-conducting tube combining superior resistance to bursting strains with capacity for being flexed without kinking or rupture.

Still another object of the present invention is to provide a superior composite fluid-conducting tube providing a reserve fluid-tight wall in the event of the rupture of the wall normally relied upon to confine the fluid being conducted.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 1 is a view in side elevation of one form of composite fluid-conducting tube embodying the present invention;

Fig. 2 is a transverse sectional view taken on the line 2—2 of Fig. 1;

Fig. 3 is a view thereof in central longitudinal section;

Fig. 4 is a view partly in side elevation and partly in central longitudinal section of another form of composite fluid-conducting tube embodying the present invention;

Fig. 5 is a transverse sectional view taken on the line 5—5 of Fig. 4; and

Fig. 6 is a perspective view of a fragment of the spacing cord.

The composite fluid-conducting tubes of the present invention are admirably suited for employment in airplanes to conduct both fuel and lubricating oil under circumstances where vibration is a factor which causes serious trouble by crystallizing metallic tubing, thus causing its ultimate breakage and the attendant hazard of fire and mechanical damage to the power plant and the plane itself.

The composite fluid-conducting tubes or ducts of the present invention are also useful in a wide variety of situations, but are specially well suited for use in refrigeration systems where high pressures are ordinarily employed and where the weakening of the inner tube in the event of fire would constitute a hazard to the fireman and otherwise.

The particular composite fluid-conducting tube herein chosen for illustration in Figs. 1 to 3 inclusive, comprises a body-tube 10 of relatively-thin imperforate wrought-metal and preferably formed of copper, copper-base material, or other non-ferrous corrosion-resisting material well annealed to provide flexibility and superior resistance to crystallization. The major portion of the exterior surface of the said body-tube 10 is provided with a helical wrapping of sheet-metal vibration-dampening tape 11. The sheet-metal tape 11, as is especially well shown in Fig. 3, has its central portion 12 closely fitting the outer periphery of the body-tube 10 and has its respective opposite edge-portions 13 and 14 deflected outwardly into concavo-convex form to such degree that the edge-portion 14 of one convolution of the tape 11 will snugly fit within and conform to the curvature of the opposite edge-portion 13 of the adjacent convolution of the said tape.

The sheet-metal tape 11 is preferably formed of relatively-soft steel having the properties of superior tensile strength under elevated temperatures than would have the copper or similar non-ferrous body-tube 10 when the entire structure is subjected to excessive heat as, for instance, in the event of the burning of the building in which it might be installed. The sheet-metal tape 11 also is preferably formed of a material, such as steel, iron or bronze, which will have a different natural period of vibration from that of the body-tube 10, so as to act as a vibration-dampener therefor and thus retard the crystallizing effects of vibration upon the said body-tube 10.

The terminal-end 15 of the body-tube 10 fits within a socket 16 in a terminal-fitting 17 and preferably abuts against a stop-shoulder 18 therein, as is shown in Fig. 3. The outer portion of the socket 16 in the terminal-fitting 17 is shaped to provide a tapering convex deflecting-surface 19 terminating at its portion of smaller diameter in the stop-shoulder 18 and terminating at its opposite end in a threaded portion 20 in the inner portion of the said socket 16. The deflecting-surface 19 of the socket 16 in the terminal-fitting 17 is adapted to inwardly deflect the compression-lip 21 of a clamping-bushing 22 which is sleeved over the terminal-portion 15 of the body-tube 10 and which is provided with an externally-threaded portion 23 engaging with the threaded portion 20 of the socket 16 in the terminal-fitting 17. The portion of the clamping-bushing 22 which projects beyond the back face of the terminal-fitting 17 is provided with a polygonal wrench-receiving head 24 by means of which the said clamping-bushing may be threaded tightly into the socket 16 in the terminal-fitting 17 to a degree necessary to cause its clamping-lip 21 to be deflected sufficiently against the outer periphery of the terminal-portion 15 of the body-tube 10, so as to form a fluid-tight joint with the said terminal-fitting and to firmly mechanically interlock the said body-tube therewith. The outer face of the polygonal wrench-receiving head 24 of the clamping-bushing 22 is formed with an annular recess 25 into which extends the adjacent end of the sheet-metal vibration-dampening tape 11 which is preferably secured in the said recess by means of a radial set-screw 26.

About midway of its length the terminal-fitting 17, which is preferably formed of brass or other non-ferrous material, is provided with a polygonal wrench-receiving portion 27 from which rearwardly projects an externally-threaded tubular stem 28 by means of which the fitting and hence the entire composite fluid-conducting tube may be attached to any desired piece of apparatus.

For the purpose of illustration let it be assumed that the terminal-fitting 17 and hence the body-tube 10, vibration-dampening tape 11 and associated parts are connected to a refrigeration compressor. The vibration of the compressor will, of cousre, tend to crystallize the body-tube 10, but such crystallization will be very markedly reduced or nullified by the dampening action of the tape 11 which, by virtue of the fact that it is a discontinuous tube, will have a markedly-different natural period of vibration from the natural period of vibration of the body-tube 10 and hence will dampen the vibrations of the latter and thus retard or prevent the crystallization of the same.

Now in the event of a fire in the vicinity of the structure shown in Figs. 1 to 3 inclusive, the body-tube will soften at elevated temperatures and thus lose a large percentage of its tensile strength, with the result that the high pressure refrigerant within the body-tube 10 will expand the latter and ultimately burst the same, were it not for the fact that the reinforcing tape 11 will still maintain a relatively-high tensile strength at the same temperature at which the body-tube 10 materially weakens. Thus, in addition to acting as a vibration dampener, the tape 11 will act as an anti-bursting sheath for the body-tube 10 when the latter is so weakened by high temperatures as to no longer be able to effectively resist high internal pressures.

The character of the vibration-dampening tape 11 is such that as the body-tube 10 is bent to meet the exigencies of different installations, the said anti-vibration tape 11 will freely flex with the body-tube 10 without opening up any of the joints between the convolutions of the said tape.

When the body-tube 10 is formed of a metal having such markedly-different electrode-potential than the material of the vibration-dampening tape 11 as might cause electrolytic action, it is preferable to interpose between the two said elements an insulating sheathing, which may be conveniently done by coating the body-tube 10 upon its exterior with an insulating varnish or lacquer or by winding the periphery thereof with a tape of electrically insulating material.

The particular form of the present invention illustrated in Figs. 4 to 6 inclusive, includes an imperforate body-tube 30 formed of corrosion-resisting wrought metal such as copper, etc., and having its terminal-portion 31 entered into an axial socket 32 formed in one end of a terminal-fitting 33 and corresponding to the socket 16 before described and, like the same, terminating at its outer end in a stop-shoulder 34, against which the adjacent end of the body-tube 30 abuts. Fitting into the socket 32 is a clamping-bushing 35 having the same general characteristics as the clamping-bushing 22 above described and, like the same, serving to form a fluid-tight connection between the body-tube 30 and the terminal-fitting 33 and also to provide a secure mechanical connection between the two said elements.

The terminal-fitting 33 is provided with an externally-threaded tubular stem 36 by means of which the assembly may be connected to the desired device such, for instance, as the compressor of a refrigerating system, the carburetor of an airplane engine or the oil reservoir thereof, or the like.

About midway of its length, the terminal-fitting 33 is provided with a wrench-receiving portion 37, and on the opposite side of the said wrench-receiving portion from the tubular stem 36, with an externally-threaded portion 38, as is clearly shown in Fig. 4.

Helically wrapped around the body-tube 30 is a sheet-metal vibration-dampening tape 39 corresponding to the vibration-dampening tape 11 described in connection with the structure shown in Figs. 1 to 3 inclusive and, like the same, having its convolutions interlocked against separation along the axis of the structure.

Wrapped around the vibration-dampening tape 39, so as to lie in the valleys or grooves formed by the shaping and interfitting of the various convolutions of the said tape, is a helically-arranged resilient spacing-cord 40, which in the structure shown is in contact with the inner surface of a guard-tube 41 axially positioned with respect to the body-tube 30, vibration-dampening tape 39 and the resilient spacing-cord 40. The spacing-cord 40 is preferably formed of synthetic rubber or other non-metallic vibration-dampening material capable of resisting the softening or disintegrating action of oil, gasoline, refrigerating fluids, etc., though the said spacing-cord may, if desired, be formed of such material as asbestos, textile material, or the like.

The terminal-portion 42 of the guard-tube 41 fits within the inner end-portion 43 of a coupling-fitting 44, which is provided with an internally-threaded outer end-portion 45 threadedly receiving the externally-threaded portion 38 of the terminal-fitting 33 before described.

As thus constructed and arranged, the intermediate portion of the coupling-fitting 44 provides an interior chamber 46, the outer end-wall of which is formed by the terminal-fitting 33 and the clamping-bushing 35 and which is in communication with the interior of the guard-tube 41, as shown in the drawings.

The interior of the inner end-portion 43 of the coupling-fitting 44 is provided with a tapering deflecting-surface 47 which merges into internal threads 48 within said inner end-portion 43 of the coupling-fitting 44. Sleeved over the terminal-portion 42 of the guard-tube 41 is a clamping-bushing 49 having external threads 50 on its intermediate portion which engage with the threads 48 of the coupling-fitting 44, as is shown. The said clamping-bushing is also provided with a compression-lip 51 engageable with the deflecting-surface 47 in the coupling-fitting 44, to be thereby pressed into intimate engagement with the periphery of the terminal-portion 42 of the guard-tube 41 to insure a fluid-tight connection and a substantial mechanical connection between the said guard-tube and the said coupling-fitting. The end of the clamping-bushing 49 opposite its compression-lip 51 is provided with a wrench-receiving portion 52 by means of which it may be threaded firmly into place.

Preferably the coupling-fitting 44 is formed in its periphery about midway of its length with a lateral port 53 which is internally threaded and which at its inner end intersects the chamber 46. Threaded into the port 53, just referred to, is a pipe 54 which may lead to a pressure-gauge (not shown) for the purpose as will more fully hereinafter appear.

For the purpose of illustration, let it be assumed that the terminal-fitting 33 of the structure of Figs. 4, 5 and 6 is connected to the pressure oil-feed line of an internal combustion engine and that the oil is flowing through the interior of the body-tube 10. The vibrations incident to the service referred to will tend to vibrate the said body-tube and therefore tend to crystallize the same, but the vibration-dampening tape 39 having as it does a different natural period of vibration from that of the said body-tube, will effectively minimize such tendency to crystallize. Furthermore, the resilient spacing-cord 40 will also serve to absorb and dampen the vibratory energy not only of the body-tube 30 but also of the guard-tube 41. The construction being such that the body-tube 30, vibration-dampening tape 39, and the guard-tube 41 may be bent, as required by circumstances, without depriving the assembly of the vibration-dampening properties and without parting the interlocked convolutions of the said tape.

Now let it be assumed that for some reason a rupture actually occurs in the body-tube 30 so that pressure from within said body-tube 30 will effect or be effected by the predetermined pressure (air-pressure, for instance) maintained in the chamber 46 of the coupling-fitting 44. The resulting pressure change will be indicated by a suitable pressure-gauge connected to the pipe 54, thus warning the operator that a fracture has occurred in the body-tube 30.

It may be explained in this connection that in the event of a fracture of the body-tube 30 in that portion of its length which is covered by the anti-vibration tape 39, the fluid may escape into the chamber 46 in the coupling-fitting 44 by way of the helical passage formed between the crowned portions of the said tape 39 and the outer-periphery of the body-tube 30. It may also be explained in this connection that if the pressure (air-pressure for instance) in the chamber 46 of the connecting-fitting 44 is maintained at a lower pressure than the pressure within the body-tube 30, a rupture in the body-tube 30 will instantly cause a rise in pressure in any gauge connected to the pipe 54. Conversely, as may be the case under some circumstances, if a higher pressure is maintained in the chamber 46 of the connecting-fitting 44 than prevails in the body-tube 30, a fracture in the latter will permit the leakage of the higher pressure outside of the said body-tube into the same and thus cause the gauge connected to the pipe 54 to indicate a drop in pressure. In either event, by means of a suitable gauge, the operator may be warned of any rupture in the body-tube 30.

In the event of a rupture such as those above referred to in the body-tube 30, the guard-tube will still maintain a fluid-tight duct, and after the same has become filled with the fluid being conveyed, the supply of fluid will continue to flow through the body-tube 30 without causing an interruption of service or fire hazard or the like until such time as repairs or replacements can be made.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A composite fluid-conducting tube-structure, including in combination: an imperforate wrought-metal body-tube having substantially-smooth interior and exterior surfaces; a wrought-metal guard-tube substantially concentrically arranged with respect to the said body-tube and surrounding the same; and a vibration-dampening ribbon or tape of reinforcing metal having its convolutions mutually interlocked and helically extending around the exterior of the said body-tube and located within the interior of the said guard-tube, and having a natural period of vibration differing from the natural period of vibration of both the said body-tube and the said guard-tube.

2. A composite fluid-conducting tube-structure, including in combination: an imperforate wrought-metal body-tube having substantially-smooth interior and exterior surfaces; a wrought-metal guard-tube fitted over the said body-tube; a vibration-dampening tape helically wrapped around the exterior of the said body-tube and having its convolutions mutually interlocked in a manner providing a helical groove on its exterior surface; and a spacing-cord helically wrapped around the exterior surface of the said helically-wrapped vibration-dampening tape or ribbon in the helical groove therein and extending into close proximity to the interior surface of the said guard-tube to guard the same and the said body-tube against crystallization incident to vibration.

3. A composite fluid-conducting tube including in combination: an imperforate wrought-metal body-tube; and a vibration-dampening ribbon or tape of reinforcing metal helically-wrapped about the exterior of said body-tube; each helical convolution between two adjacent convolutions having a helical central portion of substantial width supporting and reinforcing the said body-tube and also having helical opposite edge-portions extending from said central portion; both of said edge-portions being of similar concavo-convex form and with the concavity of each directed toward said body-tube; each two adjacent concavo-convex edge-portions of adjacent convolutions being arranged in overlapping sliding relation; and the said ribbon or tape having a markedly-different natural period of vibration than the said body-tube to guard the latter against crystallization.

HAROLD C. DANIELS.